Feb. 3, 1931.  C. G. STRANDLUND ET AL  1,790,682
DISK GANG PLOW
Original Filed Oct. 1, 1918    3 Sheets-Sheet 1
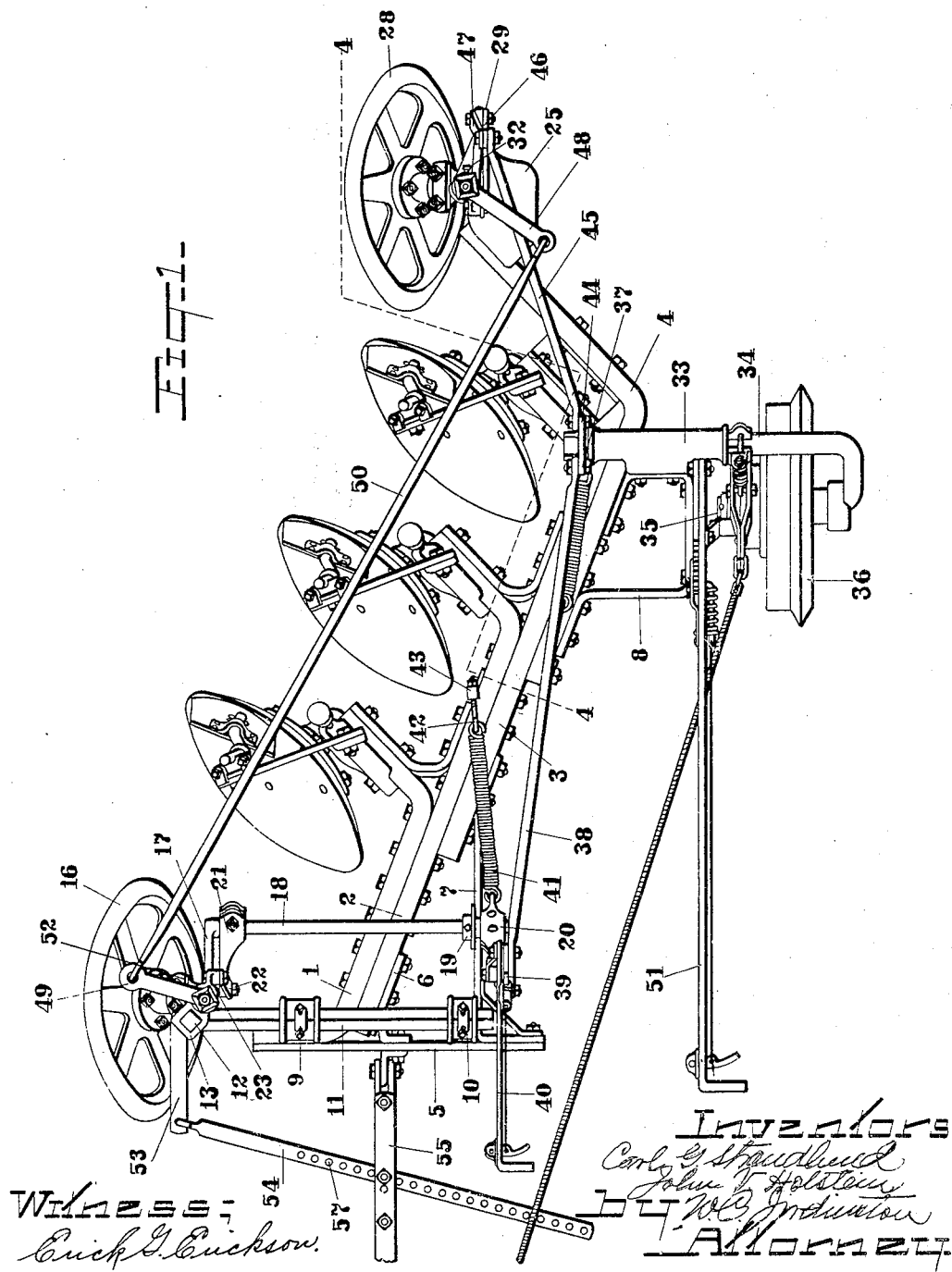

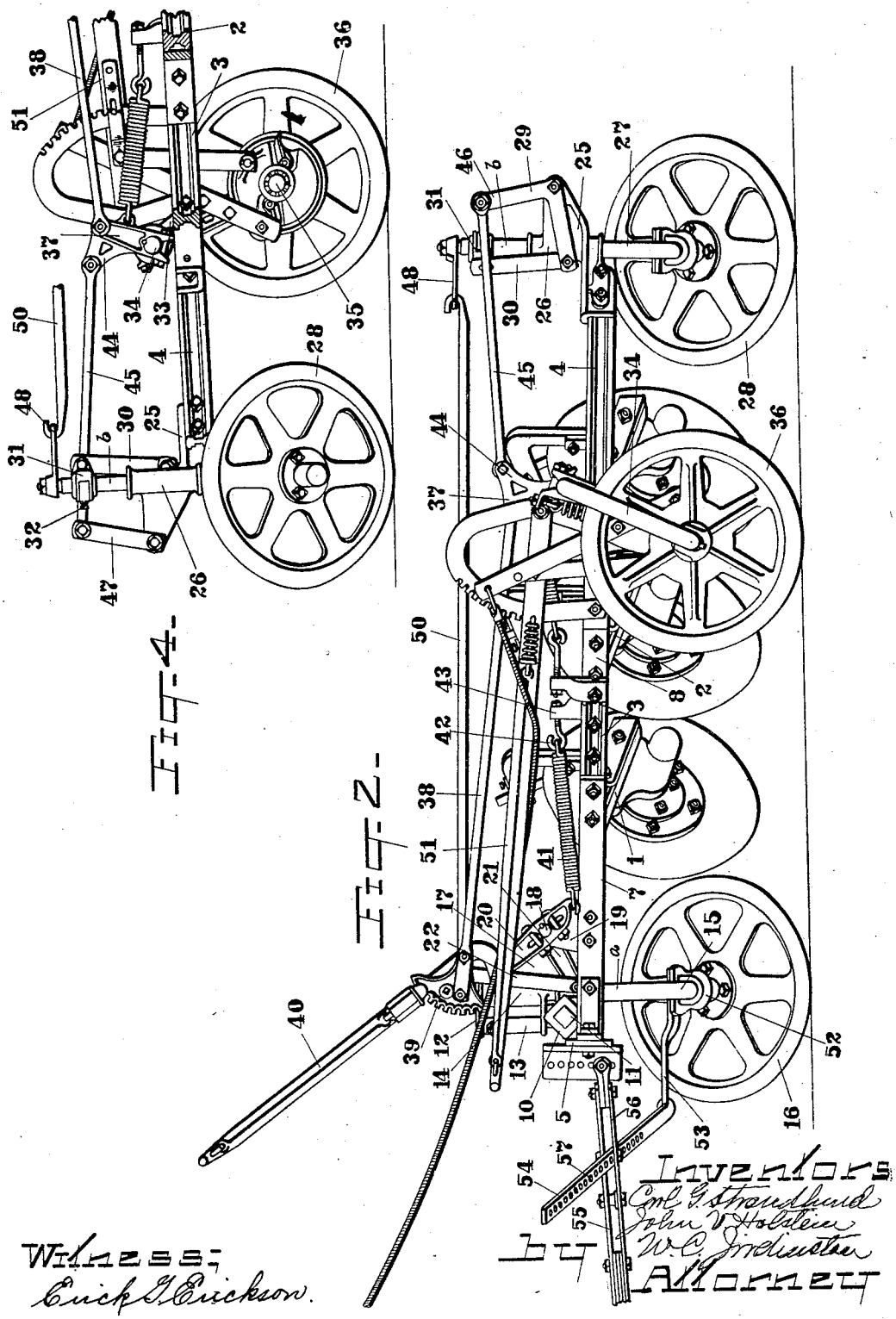

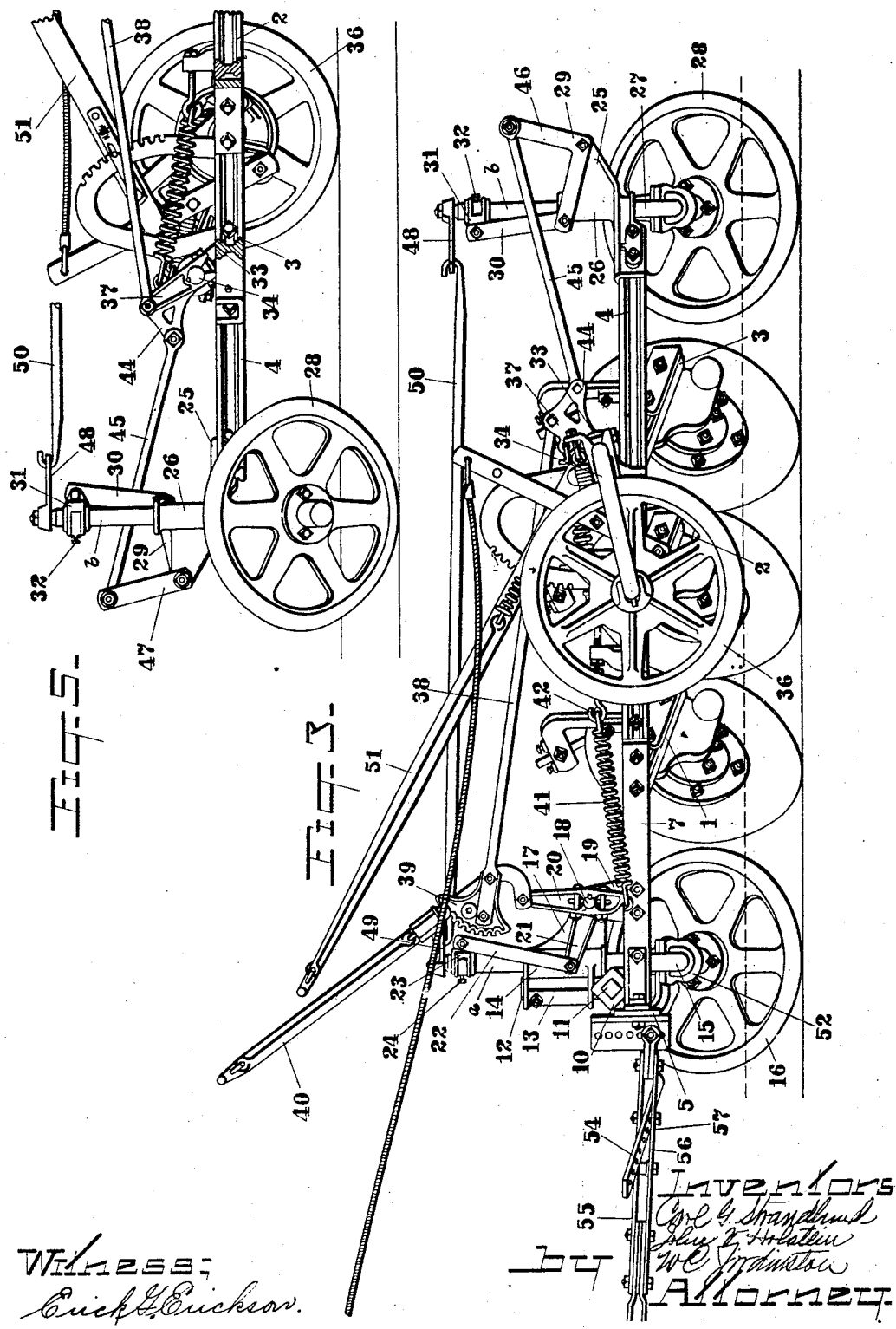

Patented Feb. 3, 1931

1,790,682

UNITED STATES PATENT OFFICE

CARL G. STRANDLUND AND JOHN V. HOLSTEIN, OF MOLINE, ILLINOIS, ASSIGNOR TO DEERE & COMPANY, OF MOLINE, ILLINOIS, A CORPORATION OF ILLINOIS

DISK GANG PLOW

Application filed October 1, 1918, Serial No. 256,391. Renewed February 4, 1924.

Our invention relates to gang plows and particularly to plows comprising a frame or beam structure to which the furrow openers are attached, and which is supported on front and rear furrow wheels and a land wheel in such manner that it may be raised to lift the furrow openers out of operative position by power derived from the traction of the land wheel, and it has for its objects to provide an improved frame structure by which the furrow openers will be firmly supported and the draft power will be properly transmitted thereto so that they will operate to the best advantage; to provide improved power actuated means for lifting the frame to carry the furrow openers out of operative position, which will be peculiarly advantageous in connection with disk furrow openers; and to provide a power lift plow of this description with draft controlled means for steering the front and rear furrow wheels. We accomplish these objects, as illustrated in the drawings and as hereinafter described. What we regard as new, is set forth in the claims.

Referring to the drawings in which similar numerals indicate identical parts—

Figure 1 is a plan view of a gang disk plow embodying our invention.

Figure 2 is a side elevation of Figure 1.

Figure 3 is a side elevation with the plow in operative position.

Figure 4 is a section taken on the line 4—4 of Figure 1 and viewing the landwheel and rear furrowwheel and connections from the furrowward side of the plow, and Figure 5 is a similar view with the parts in a different position.

The frame of the plow comprises beams 1, 2, 3, and 4, rigidly bolted together; the beams 1, 2 and 3 for a portion of their length, are bent rearwardly and furrowward with a downward inclination, and upon them are mounted disk plows of a well known type. The beam as a whole is disposed diagonally, its forward end being inclined toward the furrowward side of the plow, at which point it is provided with a transverse bar 5 rigidly secured to the forward end portion of the beam 1, which is bent furrowward, as shown in Figure 1, and also to the beam 2 preferably by means of a brace 6. The bar 5 extends landward beyond the said brace, and its landward end portion is firmly secured to the beam structure at a longitudinally intermediate point by a brace 7, the front end of which is secured to the bar 5, while the rear end thereof is secured to the beam 3. Adjacent to but somewhat in rear of the middle portion of the beam structure is a bracket 8 which projects landward therefrom and is rigidly bolted to the beam 4, as shown in Figs. 1 and 2. It will be evident from the foregoing that the beam as a whole constitutes a diagonally arranged bar extending fore and aft that is made up of the several beams 1, 2, 3 and 4 and is adapted to support the furrow openers.

Held rigidly in bearings 9 and 10, secured to the beam 1 and the brace 7, is a transversely extending bar 11, preferably rectangular in cross section, having its furrowward end 12 bent upward practically at a right angle, on which I mount a bracket 13. A sleeve 14, preferably integral with the bracket 13, forms a bearing in which is journaled the vertical spindle a of a crank axle 15 on which is mounted the front furrowwheel 16. In a rearwardly extending support 17, formed preferably integral with the bracket 13, is journaled the furrowward end of a transverse rockshaft 18, the opposite end of which is journaled in a bearing 19 mounted on the main frame by means of the brace 7. The rock shaft 18 extends beyond the bearing 19 to accommodate an arm 20 which is keyed or otherwise secured thereon intermediate its length.

On the rock shaft 18, adjacent the support 17 is rigidly secured a forwardly extending arm 21 having pivotally secured to its extremity a link 22 which is also pivotally connected to a collar 23 on the upper portion of the vertical spindle a of the crank axle 15, the collar 23 being held in place by a bolt 24 which projects through a slot in the collar 23 so as to permit a limited rotary play of the spindle therein.

Securely bolted to the rearward end of the beam 4 is a bracket 25 having a sleeve 26 in which is rotatably mounted a vertical spindle $b$ of a crank axle 27 on which is carried the rear furrowwheel 28. On a rearwardly extending portion of the bracket 25 is pivotally mounted a bell crank 29 to the end of a horizontal portion of which is pivotally connected a link 30 which is also pivotally attached to a collar 31 held on the upper portion of the spindle $b$ by a bolt 32, the latter extending through a slot in the collar 31 to permit a limited rotary movement of the spindle $b$.

A transverse bearing or auxiliary frame 33 is rigidly bolted to the bracket 8, and therein is journaled a crank axle 34 which extends landward from the bearing 33 and is then bent downward at substantially a right angle and terminates in a portion 35 substantially parallel to the part held in the bearing 33. On the portion 35 is mounted the landwheel 36 provided with a clutch mechanism by which the traction power of the landwheel is employed to raise the plow, as fully described and illustrated in Letters Patent to Carl G. Strandlund, Reissue No. 15,828, dated April 29, 1924. On the furrowward end of the crank axle 34, projecting beyond the bearing 33, is rigidly secured an arm 37 to which is pivotally secured a forwardly extending rod 38 having a segment 39 rigidly mounted on the forward end thereof; a hand lever 40 is pivoted on the rod 38 and is provided with a latch to engage with the segment in the usual manner.

The lever 40 extends below its pivotal connection to the rod 38 from which point it is bent forwardly and pivotally connected to the upper end of the arm 20; a hook is formed on the lower end of the arm 20 to which is connected a relief spring 41, the latter extending to engagement with a hook bolt 42 secured on a bracket 43 on the beam 2. The arm 37 is provided with a rearwardly extending portion 44 to which is pivotally connected a rod 45 which extends rearwardly to pivotal connection with the vertical arm 46 of the bell crank 29. A strap 47 is secured on the opposite side of the rearwardly extending portion of the bracket 25 and parallel to the vertical arm of the bell crank 29 to the upper end of which it is bolted; the purpose of the strap 47 being to reinforce the vertical arm of the bell crank 29 against lateral strain.

A landwardly extending arm 48 is rigidly secured to the upper termination of the spindle $b$, and a similar arm 49 is secured to the spindle $a$ but extending in a furrowward direction, said arms being connected together by a steering rod 50, so that in steering the plow both furrow wheels will be swung simultaneously but in opposite directions.

As shown in Figure 3 the arm 37 is substantially at the limit of its rearward rocking movement when the plow is in operative position, and the point of connection of the rod 45 with the rearwardly extending portion 44 of the arm 37 is below the plane of the point of connection of the rod 38 with the arm 37. Consequently when the arm 37 is rocked forwardly, in the operation of raising the plow either out of operative position or for the purpose of changing the depth at which it is desired the plow shall work, the effect upon the rear furrow wheel of the rocking movement of the arm 37 is practically nil until the rods 38 and 45 are in substantial alinement, but the effect upon the front furrowwheel of the rocking movement of the arm 37 is practically instantaneous and therefore the forward part of the plow will be raised in advance of the rear part until the rods 38 and 45 are substantially in alinement.

The crank axle 34 is rockable by operation of a lever 51, as more fully detailed in the Strandlund patent above referred to, to swing the landwheel 36 to raise or lower the plow to regulate the depth of plowing. The rear furrowwheel 28 travels in the previously made furrow and, the front furrow wheel 16 coacts with the landwheel in the usual way. On a casting 52, rigidly mounted on the crank portion of the crank axle 15 we secure rigidly a forwardly extending link 53 pivotally connected to a laterally extending bar 54 by means of a hook on the latter engaging with a suitable perforation in the link 53. A draft bar, pivotally connected to the transverse bar 5 of the frame, is composed of an upper member 55 and a lower member 56 spaced apart to permit of the passage therebetween of the bar 54, and adapted to be connected to a tractor in any suitable manner. The bar 54 is provided with a series of perforations 57 by which it is held in place on the draft bar by a bolt or pin extending through any one of the perforations 57 and the members 55 and 56 of the draft bar. By this construction it will be readily seen that when the tractor is turning, the draft bar will be swung in the direction of the turn and through the bar 54 and the link 53 the furrowwheels 16 and 28 will respond to guide the plow in the direction taken by the tractor.

The plow frame moves freely vertically on the spindles $a$ and $b$ at all times, whether traveling straight ahead or turning, when the raising mechanism is actuated to raise the plow or is tripped to lower it to an operative position.

The plow being down, as shown in Figure 3, when the clutch mechanism is tripped into action by the operator, the axle 34 rocks to swing the landwheel 36 downwardly and rearwardly, and at the same time the arm 37 is rocked forwardly, actuating the bell crank 29, through its connection therewith by the rod 45; as the bell crank 29 rocks, through the link 30 pivotally connected to the forwardly extending arm of the bell crank and to the collar 31 on the spindle $b$, the rear of the plow is raised, sliding freely on the spindle $b$. The lever 40 is engaged with the segment 39, and as the latter is rigidly connected with the rod 38 which is pivotally connected to the arm 37, these parts move together in raising the plow. The lever 40 is connected at its lower end to the arm 20 on the transverse rock shaft 18, and therefore as the arm 37 is rocked forwardly the arm 20 is also rocked in a forward direction, and by the connection of the link 22 with the upper end of the spindle $a$ the forward end of the plow is raised. By operating the lever 40 the front furrow wheel is independently adjustable to level the plow irrespective of the depth of plowing, and irrespective of the position of the rear furrow wheel and the landwheel.

The plow being raised from the ground as shown in Figure 2, if it be desired to lower it to operative position the parts of the clutch mechanism which hold the plow up, as explained in the Strandlund patent above referred to, are tripped by the operator, whereupon the weight of the plow reverses the action of the parts just described, and the plow descends to the ground. The depth of plowing is regulated by the position of the land and furrow wheels with relation to the frame, and the front furrow wheel 16 and the land wheel 36 are vertically adjustable independently of each other. The land-wheel 36 is adjustable by operation of the lever 51 as fully described in said Strandlund patent.

From the above description the following matters of structure and operation will be observed:

The shaft 18 and parts connecting it to the front spindle constitute a front lifter; the crank lever 29 and parts connecting it to the rear spindle constitute a rear lifter; and the link pivoted to the driven clutch member (see Fig. 4) and to the depth adjusting lever is a land side lifter for elevating the land side of the apparatus on the land wheel. Arm 37, with extension 44, is a lockable power device connected by the power transmitters 38 and 45 to the front and rear lifters respectively. When the disks and frame are down the three ground wheels are locked to the frame and their weight holds the disks in working position. Disk plows differ from those with rigid mold-board bodies in that the latter are positioned to provide the suction which draws the bodies downward. When they reach the pre-determined depth these bodies assist the wheels in supporting the frame. Surplus weighting is not required.

But when disks are used, even though tipped back somewhat from the vertical, they act, partially, as rolling wheels, and even if the ground be only slightly hard they tend to roll out of the furrow.

Again, the parts of disk plows must be so related that the rear furrow wheel will always run properly in the plane of the lowest points of the disks when at work, whether the disks are cutting deep furrows or shallow ones. The lifting for depth adjustment of the disks must be accomplished by applying lifting force at the land wheel and at the front furrow wheel only. There should not be the exertion of any material lifting force on the rear wheel during the times the disks are working at, or moving to, any of these various plowing depths. Yet the rear wheel should be held so as to permanently bear down on the frame during all such working periods to have its weight continuously assist in holding the disks to their work.

There should be no material lifting force exerted at the rear until the disks have been raised to the surface of the ground; then it is desirable, during the last stage of elevating the disks, to apply lifting force at the rear of the frame to elevate it rapidly on the rear wheel, and to correspondingly decrease the lifting actions at the front.

These ends are all attained with a disk plow such as illustrated. The three rolling disks are held down, even in hard ground, by the three heavy cast wheels, which, including the rear furrow wheel, are positively locked to the frame so that it is held against vertical movement with respect to said wheels.

To decrease the plowing depth the operator loosens hand lever 51, pushes it down a short distance, and then re-locks it. In doing so he moves the land wheel 36 back (thereby raising the land side of the frame) and also rocks the power device 37, which, thrusting on link 38, actuates the front lifter at wheel 16. The movements of these parts elevate the disks and beam frame to a new plowing line. The only material application of lifting force has been exerted downward on the land wheel and on the front furrow wheel. The rear lifter at wheel 26 has, during this lifting of the disks (for depth adjustment on the front wheels), been practically idle, inasmuch as the transmitting rod 45 is in dead center relation with axle shaft 34, and remains approximately so during all the depth adjusting movements of the hand lever and crank 37. That is, this transmitter 45, during depth adjustments, exerts no appreciable lifting force on the rear lifter. It permits the rear wheel to adjust itself to any of the lines followed by the bottom edges of the disks, and prevents the rear portion of the frame or the rear wheel from moving, vertically, relatively, independently of the power device, and consequently the weight of the rear wheel, because of its being so held, is constantly acting to keep the disks down.

But if, now, the disks are to be elevated to their uppermost points, above the surface, it is accomplished by the automatic power devices. In doing this the land wheel swings further backward and lifts the land side of the frame, and simultaneously rocks the power device 37 further forward. During the first part of the cycle of this automatic power lifting the transmitter 45 serves, as above described, merely as a holder for the wheel and frame, it being, during that time, practically inactive as concerns the application of appreciable lifting power. But during the latter part of the power lifting movement, that is, after the disks have about reached the surface, the power device 37 rocks through that part of its path where it rapidly and powerfully actuates transmitter rod 45, and this results in quickly acting on the rear lifter; the front transmitter 38 now moving through that part of its path where it actuates the front lifter with less speed. Thus, by the construction described, the power device acts through the two power transmitters to operate the front lifter and the rear lifter inversely as to their speeds.

The power device at 37, 44 is offset, landward, in relation to the parts at the front end and those at the rear end. From this power device the traction-generated power is taken backward and forward to the lifters at the rear and the front spindles; these spindles being rotatable horizontally and independently of the lifters.

The draft devices 54, 55 transmit power to the rod 50 which connects the spindles; and, therefore, the operator can optionally steer the structure by power, and can, at his option, by the clutch control, cause the actuating of the land side lifter and of the lifters at the spindles.

Hence, as above described, these lifting and lowering movements of the frame and disks can be accomplished either while the structure is moving on straight lines, or simultaneously with its steering movements optionally caused by the operator when he turns the tractor and applies its power to positively turn the horizontally swinging wheels.

While the improved power lift construction, above described, is peculiarly advantageous in connection with gang plows employing furrow openers in the form of disks for the reasons hereinbefore given, it may also be used to advantage with furrow openers of the moldboard type and, therefore, we wish it to be understood that the claims hereinafter made are intended to comprehend gang plows using furrow openers of either type.

What we claim is:

1. In a wheeled plow, the combination with a frame, and furrow openers connected therewith, of a land wheel, front and rear furrow wheels, and means for raising and lowering the frame relatively to said wheels comprising an axle pivotally mounted on said frame and having a crank portion on which said land wheel is mounted, lifting means associated with the rear portion of the frame adapted to be actuated to raise or lower the same, an actuating device for said lifting means connected with said axle and adapted to assume a position approximately in dead center relation to the axis thereof when the furrow openers are in operative position, means operated by said actuating device for lifting the frame with respect to the front furrow wheel, and means for rocking said axle.

2. In a wheeled plow, the combination with a frame, and furrow openers connected therewith, of a land wheel, front and rear furrow wheels, and means for raising and lowering the frame relatively to said wheels comprising an axle pivotally mounted on said frame and having a crank portion on which said land wheel is mounted, lifting means associated with the rear portion of the frame adapted to be actuated to raise or lower the same, an actuating device for said lifting means connected with said axle and adapted to assume a position approximately in dead center relation to the axis thereof when the furrow openers are in operative position, means operated by said actuating device for lifting the frame with respect to the front furrow wheel, means for rocking said axle to adjust the depth of plowing, and power actuated means for rocking said axle to lift the furrow openers out of operative position.

3. In a wheeled plow, the combination with a frame, and furrow openers connected therewith, of a rocking crank axle, a land wheel mounted on said axle, front and rear furrow wheels, manually adjustable means optionally operated by the traction of the land wheel for rocking said axle to lift said frame with respect to the land wheel, a rocking power device actuated by the rocking of said axle, manually adjustable means actuated by said power device for lifting the frame with respect to said front furrow wheel, lifting means adapted to be actuated to lift the frame with respect to said rear furrow wheel, and an operating connection between said power device and the latter lifting means adapted to assume approximately a dead center position with relation to the axis of said power device when the furrow openers are in their normal operating position.

4. In a wheeled plow, the combination with a frame, and furrow openers connected therewith, of a rocking crank axle, a land wheel mounted thereon, a dirigible front furrow wheel, a rear furrow wheel, the frame being vertically movable with respect to said furrow wheels, a transverse rock shaft mounted at the front portion of said frame, means operatively connecting said crank axle with said rock shaft whereby the rocking of said axle will rock said shaft, lifting devices associated with said front furrow wheel and the front portion of said frame, connections between said lifting devices and said rock shaft, optionally controlled means for rocking said axle by the traction power of the land wheel, lifting devices associated with said rear furrow wheel and the rear portion of said frame, means substantially in dead center relation to the axis of said axle when the furrow openers are in their normal operative position adapted to be actuated by the rocking of said axle when the furrow openers are lifted out of their operative position to actuate said rear lifting devices to raise the rear portion of the frame, and manually operable means for rocking said axle to vary the normal operative position of the furrow openers.

5. In a power lift plow, the combination with a frame comprising a front transverse member, a rear transverse member and means rigidly connecting said members, of draft means connected with said front transverse member, furrow openers carried by said frame, a front furrow wheel supporting the front portion of said frame, a rock shaft mounted on the front portion of said frame, means for lifting the frame relatively to said front furrow wheel by the rocking of said rock shaft, a transversely disposed axle mounted on said rear transverse member and having a crank at the landward end thereof, a land wheel mounted on said crank, optionally controlled means for rocking said axle by the tractive power of the land wheel, means connecting said rock shaft with said axle and manually operable to rock said rock shaft independently of said axle, manually operable means for rocking said axle and said rock shaft in unison, a rear furrow wheel supporting the rear portion of the frame, lifting devices associated with said rear furrow wheel for lifting the frame relatively thereto, and actuating means for said lifting devices connected with said axle and operated by the rocking thereof, said actuating means being in approximately dead center relation to the axis of said axle when the furrow openers are in their normal operative position.

6. In a wheeled plow, the combination with a frame, and furrow openers connected therewith, of a land wheel, front and rear furrow wheels, and means optionally actuated by the traction of the land wheel for lifting said frame with respect to all of said wheels, said lifting means comprising a rockable power device, and a power transmitter normally in dead center relation to the axis of the power device and cooperating therewith to hold the rear portion of said frame against upward movement relatively to said rear furrow wheel when the furrow openers are in normal operative position.

7. In a wheeled plow, the combination with a frame, and furrow openers connected therewith, of a crank axle rockably connected with the frame, a land wheel mounted on said axle, furrow wheels with respect to which said frame is vertically moved, lifting devices associated with said front and rear furrow wheels respectively, a power device connected with said axle to rock therewith, and power transmitters positively connecting said lifting devices respectively with said power device and actuated by the rocking of the crank axle in either direction to move the frame vertically relatively to said front and rear furrow wheels, the power transmitter connected with the rear lifting device being normally in dead center relation to the axis of the power device, and the power transmitter connected with the front lifting device being in off center relation to said axis.

8. In a wheeled plow, the combination with a frame comprising a substantially horizontal beam having its rear end extending diagonally toward the land side of the plow, and a plurality of furrow openers supported by said beam, of a draft bar connected to said frame for lateral swinging movement, front and rear furrow wheels each having a vertical spindle, vertical guides on said frame in which said spindles can slide and also rotate, means operatively connecting said draft bar with said spindles whereby both of said furrow wheels are inclined to different steering angles with the swinging movement of said draft bar, a transverse shaft mounted on said frame adjacent to the front end thereof, lifting devices connecting said shaft to the spindle of the front furrow wheel, means for lifting the frame on the spindle of the rear furrow wheel, a power shaft mounted on the frame, an arm on said latter shaft, a wheel spindle extending from said latter shaft, a land wheel mounted on said latter spindle, a lift clutch comprising a continuously rotating driving element actuated by the land wheel and a driven rotary element adapted to be driven thereby, power transmitters actuated by said clutch for lifting the land side of the frame and actuating the arm on said power shaft, a link connecting said arm with the lifting means at the rear furrow wheel, a link extending from said power shaft and operatively connected with said front transverse shaft, said rear link and said arm substantially aligning with the axis of said power shaft when the plow is in working position, said front link and said arm being out of alignment with said axis when the plow is in working position, and manually actuated means operable from the tractor for controlling said lift clutch, said links being operable to cause lifting motion of said frame along said front and rear furrow wheel spindles simultaneously with the rotation of said spindles incident to steering movement of the plow.

9. In a wheeled plow, the combination with a frame and furrow openers connected therewith, of a land wheel, front and rear furrow wheels, and means for raising and lowering the frame relatively to said furrow wheels comprising lifting means associated with the rear portion of the frame adapted to be actuated to raise or lower the same, a pivotally moving actuating device for said lifting means adapted to assume a position approximately in dead center relation to the pivotal axis thereof when the furrow openers are in operative position, means operated by said actuating device for lifting the frame with respect to the front furrow wheel, adjusting means for rocking said actuating device to adjust the depth of plowing, and power actuated means for rocking said actuating device to lift the furrow openers out of operative position.

10. In a wheeled plow, the combination with a frame, and furrow openers connected therewith, of a land wheel, a swinging crank axle on which said land wheel is mounted, front and rear furrow wheels, and means for raising and lowering the frame relatively to said furrow wheels comprising lifting means associated with the rear portion of the frame adapted to be actuated to raise or lower the same, a pivotally swinging actuating device for said lifting means adapted to assume a position approximately in dead center relation to the pivotal axis thereof, when the furrow openers are in operative position, said actuating device being operated by said crank axle, means operated by said actuating device for lifting the frame with respect to the front furrow wheel, adjusting means for swinging said crank axle and said actuating device to adjust the depth of plowing, and power actuated means deriving its power from the traction power of said land wheel for swinging said crank axle and said actuating device to lift the furrow openers out of operative position.

CARL G. STRANDLUND.
JOHN V. HOLSTEIN.